United States Patent [19]
Coombe

[11] 3,807,665
[45] Apr. 30, 1974

[54] AIRCRAFT

[75] Inventor: Andrew J. Coombe, Bembridge, England

[73] Assignee: Britten-Norman (Bembridge) Limited, Isle of Wright, Great Britain

[22] Filed: Jan. 27, 1972

[21] Appl. No.: 221,192

[30] Foreign Application Priority Data
Feb. 5, 1971   Great Britain...................... 4061/71

[52] U.S. Cl. ............................................. 244/55
[51] Int. Cl. ........................................ B64d 27/02
[58] Field of Search...... 244/55, 53 R, 54, 58, 12 R, 244/13, 15

[56] References Cited
UNITED STATES PATENTS
3,244,246   4/1966   Weiland........................ 244/12 R X
3,652,035   3/1972   Fredericks..................... 244/54 X
3,666,211   5/1972   Cathers et al.................... 244/55

FOREIGN PATENTS OR APPLICATIONS
875,648   9/1942   France.............................. 244/55

Primary Examiner—George E. A. Halvosa
Assistant Examiner—Barry L. Kelmachter
Attorney, Agent, or Firm—Brisebois & Kruger

[57] ABSTRACT

A multi-engined aircraft has an uneven plurality of engines each driving a propeller. An even number of these engines are mounted symmetrically on the wings of the aircraft and one engine is mounted on a tail fin of the aircraft with its propeller above the fuselage of the aircraft. This engine is preferably mounted in a nacelle at or near the top of the tail fin and the nacelle merges at its after end into a tail plane which is also mounted at or near the top of the tail fin.

2 Claims, 1 Drawing Figure

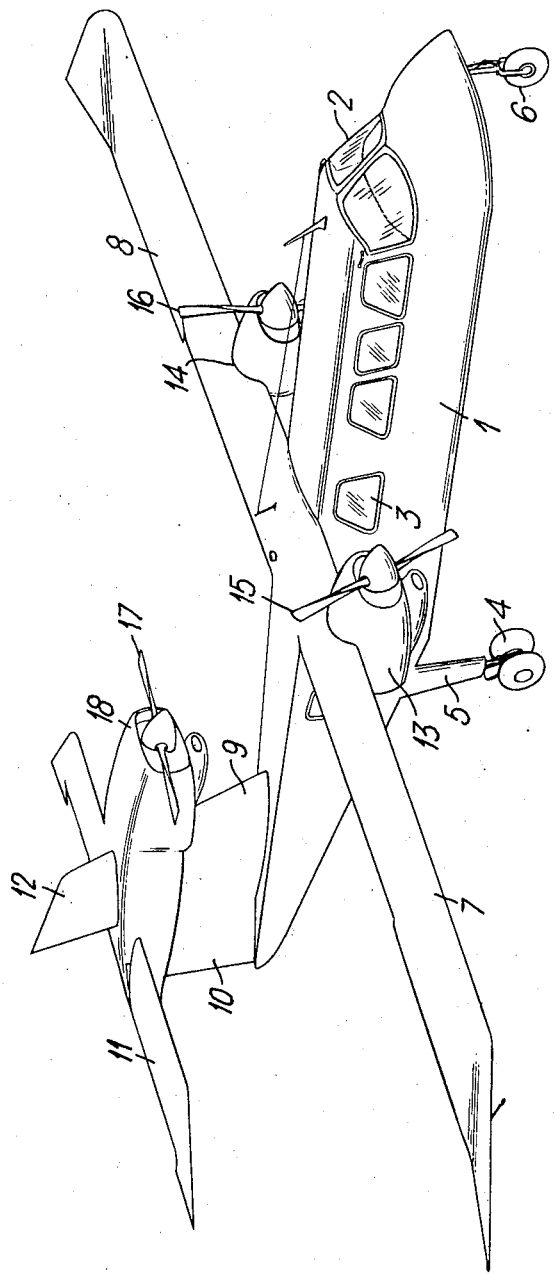

AIRCRAFT

When a multi-engined aircraft is provided with an odd number of propeller engines, it has been usual in the past to mount one of the engines on the nose of the fuselage of the aircraft in front of the cockpit.

The mounting of one of the engines in this position does, however, have a number of disadvantages and for this reason the provision of an odd number of propeller engines has become rather rare.

There are nevertheless advantages in providing an aircraft with an odd number of propeller engines, usually three, and the aim of the present invention is to do this in such a way that the disadvantages of providing one engine on the nose of the fuselage are avoided and advantages are achieved in their place.

According to this invention, a multi-engined aircraft with an odd number of engines each driving a propeller has an even number of engines mounted symmetrically on its wings and one engine mounted on its tail fin with its propeller above the fuselage.

The propeller driven by the engine mounted on the tail fin may be a pusher mounted behind the tail fin and tail plane, but it is preferably a tractor mounted in front of the rudder and tail plane.

The mounting of the single central engine on the tail fin not only overcomes the disadvantages inherent in the mounting of the engine on the nose of the fuselage, but also produces advantages amongst which are that the slip stream from or to the propeller flows directly over the control surfaces of the rudder and of the tail plane and this greatly improves the low speed maneuverability and controllability of the aircraft when airborne and also its maneuverability and controllability when taxiing on the ground. Secondly the engine, being clear of and above the fuselage has a smooth undisturbed airflow. Thirdly, the exhaust gases from the engine may be discharged directly aft and this provides a small additional thrust and, finally, the engine slip stream can help to decrease the changes of aircraft trim due to power if a tail plane of variable incidence or the correct incidence is mounted directly behind the engine.

Preferably the engine is mounted in a nacelle which projects directly forwards from a position at or near the top of the tail fin and this nacelle merges at its after end into the tail plane which is also mounted at or near the top of the fin. With this arrangement the slip stream behind the propeller flows uniformly over both the upper and lower surfaces of the tail plane.

If the engine nacelle is mounted right at the top of the tail fin, the rudder has to be mounted below the level of the nacelle, but when, as is preferred, the nacelle is only near the top of the fin, the rudder may be either above or below the level of the nacelle.

An example of an aircraft constructed in accordance with the invention is illustrated in the accompanying drawing which is a perspective view from the front and one side.

The aircraft has a fuselage 1 with a cockpit 2 and a cabin 3. There is an undercarriage comprising a pair of wheels 4 supported on a leg 5 extending downwards from the fuselage 1 on the starboard side of the aircraft, a pair of wheels similarly supported on the port side of the aircraft and a nose wheel 6.

Wings 7 and 8 are mounted on the top of the fuselage 1 and a tail fin 9 projects upwards from the rear part of the fuselage 1 and carries a rudder 10 and a tail plane 11. The tailplane 11 is situated a little below the top 12 of the tail fin 9 and has an elevator mounted on its trailing edge.

Two engines are enclosed in nacelles 13 and 14 which are mounted symmetrically on the wings 7 and 8 respectively and these engines drive propellers 15 and 16. A third engine, which drives a propeller 17, is enclosed in a nacelle 18 which is mounted on the tail fin 9 above the rudder 10 and near, but below the top 12 of the tail fin 9. The nacelle 18 merges at its rear end into the tail plane 11 so that the slip stream from the propeller 17 when the engine in the nacelle 18 is in operation flows uniformly over both the upper and lower surface of the tail plane 11.

In the example illustrated, the aircraft has three engines mounted in the nacelles 13, 14 and 18, but it may alternatively, of course, have five engines, with a pair of these engines mounted on each of the wings 7 and 8 or it may have an even greater odd number of engines with one engine always mounted on the tail fin 9. Further, instead of the engine in the nacelle 18 having a tractor propeller 17 as shown, the nacelle 18 may project from the rear edge of the tail plane 11 and the engine then may drive a pusher propeller at the rear end of the nacelle. In this case the same advantage is obtained because the pusher propeller accelerates the airstream in front of it and still brings about a uniform air flow over both the upper and lower surfaces of the tail plane and over the two side surfaces of the rudder 10 to make the aircraft exceptionally maneuverable and controllable at low speed when airborne and also when taxiing on the ground.

I claim:

1. In a multi-engined aircraft including a fuse-lage, wings mounted on said fuselage, a tail fin mounted on said fuselage, a tail plane mounted near the top of said fin, an uneven plurality of engines and a propeller driven by each of said engines, the improvement comprising means mounting an even plurality of said engines symmetrically on said wings, a nacelle containing one of said engines with said propeller driven by said one of said engines in front of said nacelle, and means mounting said nacelle on said tail fin near the top of said tail fin and projecting forwardly therefrom with said nacelle merging at the rear end thereof into said tail plane and said propeller driven by said one of said engines tractor-mounted in front of said tail fin above said fuselage.

2. An aircraft as claimed in claim 1, in which there are three engines, two of said engines being mounted on said wings, one on each side of said fuselage and the third of said three engines being mounted on said tail fin.

* * * * *